Nov. 24, 1931.                L. V. FOSTER                1,833,074
                       SOUND REPRODUCING APPARATUS
                          Filed June 29, 1929

Leon V. Foster
INVENTOR
BY J. A. Tellestad
ATTORNEY

Patented Nov. 24, 1931

1,833,074

UNITED STATES PATENT OFFICE

LEON V. FOSTER, OF IRONDEQUOIT, NEW YORK, ASSIGNOR TO BAUSCH & LOMB OPTICAL COMPANY, OF ROCHESTER, NEW YORK, A CORPORATION OF NEW YORK

SOUND REPRODUCING APPARATUS

Application filed June 29, 1929. Serial No. 374,711.

This invention is applicable to the art of reproducing sounds which have been photographically recorded on film. In reproducing sound from the photographic record, the film bearing the sound record is moved between a suitable light source and a slit which permits a restricted portion of the rays to fall on a light-sensitive cell. Varying densities or areas of the sound record cause varying amounts of light to fall on the light-sensitive cell so that current variations are set up in the circuit of the light-sensitive cell and by suitable apparatus are translated into sound, all as is well known to those skilled in the art.

In reproducing sound from a photographic sound record it is essential, for the true and accurate production of sound, that only a restricted portion of the sound record be projected onto the light-sensitive cell. This restriction or limiting of the projected image of the sound record is usually effected by a narrow, linear slit. I have found, however, that such a system, using a linear slit, causes a loss of tone quality and a generally poor reproduction of sound due to the curvature of field which is introduced by the lens system which projects the sound record image. Due to the curvature of field, the projected image, which passes through a linear slit and falls on the light-sensitive cell, is relatively sharp and clear at the middle portion but is indistinct and fuzzy at the end portions. This causes the loss of tone quality and poor sound reproduction to which reference has been made. Other disadvantages and defects of the sound reproducing apparatus of the prior art are due to the fact that the sensitivity of the light-sensitive cell, used in the system, varies for different points on the area of its electrode.

By means of my invention, I am able to effect a true and accurate reproduction of sound having a tone quality which is superior to that reproduced by prior art devices.

One of the objects of the present invention is to provide an improved means for reproducing sound from a photographic sound record. Another object is to provide an improved slit unit for use in sound reproducing apparatus and a further object is to provide means for overcoming the defects of sound reproduction which are due to the non-uniform sensitivity of the light-sensitive cell. Other objects and advantages reside in certain novel features of arrangement, combination and construction of parts as will hereinafter be described and pointed out in the appended claims.

Referring to the drawings.

Figure 1:
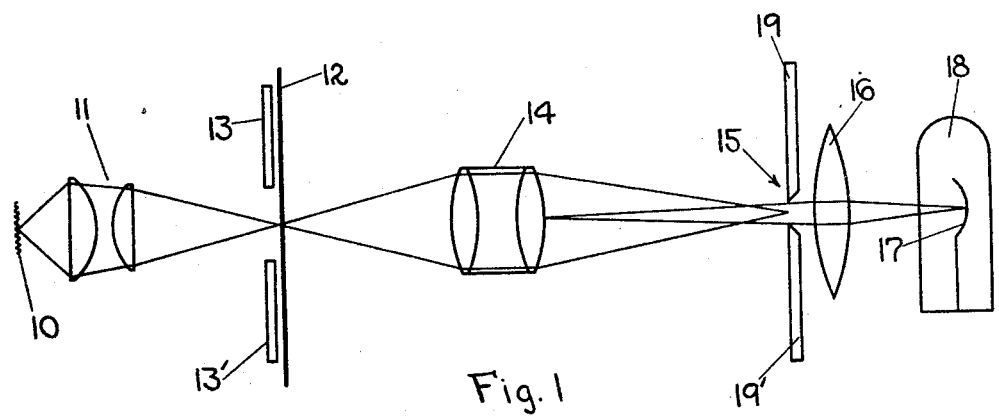
Fig. 1 is a diagrammatic view showing a side elevation of a system embodying my invention.

One embodiment of my invention is illustrated in the drawings wherein a suitable light source, indicated at 10, cooperates with a condensing lens system 11 to illuminate the sound record on the film 12 as the film is moved past a gate formed by members 13 and 13'. A suitable lens system 14 projects an enlarged image of the sound record into my improved slit which is indicated generally at 15. Behind the slit 15 is placed a collecting lens 16 which focuses the light rays, coming from lens 14 through the slit 15, onto the electrode 17 of the light-sensitive cell 18. These light rays are thusly focused onto the electrode 17 as a spot of light having a substantially uniform intensity throughout its area. As the film 12 is moved past the gate, the enlarged images of the sound records of varying densities, which are projected into the slit, cause corresponding variations in the intensity of the spot of light which is projected onto the electrode 17 of the light-sensitive cell 18. These variations in intensity, of the light falling on the light-sensitive cell, produce corresponding variations in an electrical circuit which are amplified and translated into sound by methods well known to those skilled in the art.

The system which characterizes the prior art, however, makes no use of a collecting lens, such as my lens 16, to produce a spot of light on the electrode of the light-sensitive cell. Under such a practice, therefore, the light rays falling on the electrode of the cell are in the shape and form of a relatively long, narrow band of light. The length of this band of light depends on the particular sound record image which is projected and, of course, the various sound record images are of varying lengths, corresponding to various sounds. The sensitivity of the light-sensitive cell varies for different points on its electrode. Therefore, in the prior art apparatus the reproduction is not uniform because the light bands projected onto the electrode of the cell are of different lengths and so cover different areas of the electrode which have different sensitivities. Furthermore, these light bands do not have a uniform intensity throughout the area of the band and hence the sound reproduction is not uniform.

By means of my improved system, however, the light rays, which are focused onto the electrode by a collecting lens 16, always occupy the same uniformly illuminated area on the electrode and hence the sensitivity is always constant for all sound records. Although I have shown the collective lens 16 positioned behind slit 15, the lens 16 would function equally well if placed in front of slit 15 and provided with the proper focal length.

Due to the curvature of field introduced by the lens system 14, the image of the sound record, if projected onto a flat surface, would not be sharply focused throughout its entire length. Thus, if the sound record image is projected onto a flat surface with the central portion sharply focused, the two end or side portions of the image would be out of focus and hence would be indistinct and blurred. Because of curvature of field due to lens 14, the projected sound record image, which is sharply focused throughout its entire dimension, is a curved aerial image with the concave side of its curvature towards the lens.

In order to effect a true reproduction of sound of superior tone quality it is necessary that the sound record images should be sharply focused, throughout their entire length, at the slit which is interposed in the path of projection. Obviously, this cannot be effected with the straight, linear slit, as used in the prior art, because of the curvature of field which has been described. These desired results can, however, be obtained by using my improved slit which, instead of being linear, is curved.

Figure 2:
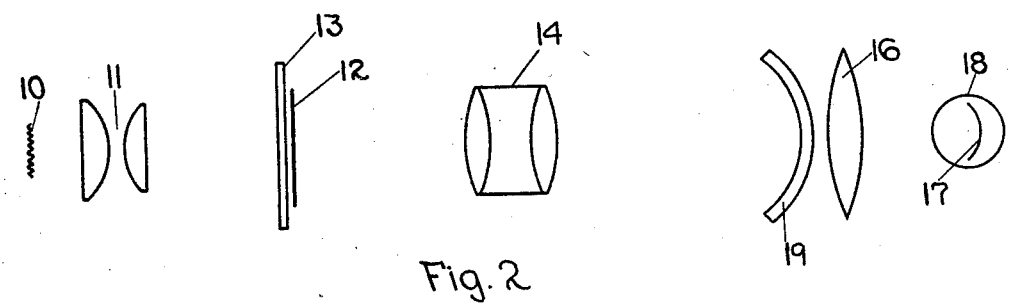
Fig. 2 is a diagrammatic view showing a top plan view of the system.

My improved slit, indicated generally at 15, comprises the two spaced members 19 and 19' which are curved, as shown in Fig. 2, with the concave side of the slit members facing the lens system 14. Although the slit is shown on the drawings in exaggerated size for sake of clearness, in actual practice the slit may be about one inch long with the two members 19 and 19' spaced about 0.005 inch apart and with the curvature of the slit defined by an arc of a circle whose radius is about one-half inch. It is to be understood, of course, that my improved slit may be made in other dimensions and formed of any suitable material by any desired method.

If an attempt is made to eliminate the curvature of field by correcting the lens 14, by methods well known to optical engineers, the effective working aperture of the lens system is greatly reduced. Such a reduction of the working aperture hinders the efficient operation of the reproducing apparatus since it does not permit the passage of a sufficient amount of light from the source 10 which is limited in intensity.

From the foregoing, it will be apparent that I am able to attain the objects of my invention and provide improved means for reproducing sound from a sound record. Various modifications and applications can obviously be made without departing from the spirit of my invention as pointed out in the appended claims.

I claim:

1. Apparatus for reproducing sound comprising in combination a light source, a film bearing a sound record in position to be illuminated by said source, a light-sensitive cell and means defining a curved slit positioned between said film and said cell with the concave side of the slit facing the film.

2. Apparatus for reproducing sound comprising in combination a sound record, a light-sensitive cell, means for projecting an image of the sound record and means defining an arcuate slit positioned between said projecting means and said cell with the axis of curvature of the slit perpendicular to the axis of said first-named means.

3. Apparatus for reproducing sound from a photographic sound record comprising a light source for illuminating a sound record, a light-sensitive cell, lens means for projecting a portion of said sound record and means defining a curved slit positioned between said cell and said lens means, the concave side of said curved slit facing said lens means.

4. Apparatus for reproducing sound from a sound record comprising in combination a light source for illuminating the sound record, a lens system for projecting an image of the sound record, a light-sensitive cell arranged in the path of projection, a curved slit positioned between said lens system and said cell, the concave side of said slit facing said lens system and a collective lens positioned between said slit and said cell.

5. Apparatus for reproducing sound from a sound record comprising a light source for illuminating the sound record, a lens system for projecting an image of the sound record, a light-sensitive cell arranged along the axis of said lens system, means defining a curved slit positioned between said system and said cell, the axis of curvature of said slit being perpendicular to said axis and a lens positioned adjacent to said slit for collecting light rays from said slit and focusing them on said cell.

6. Apparatus for reproducing sound from a sound record comprising a light-sensitive cell, diaphragm means positioned in front of said cell, a projection system for projecting an image of the sound record onto the plane of the diaphragm means and lens means between said system and said cell for projecting onto said cell a spot of light having a substantially uniformly illuminated fixed area.

7. Apparatus for reproducing sound from a sound record comprising a light source for illuminating the sound record, a light-sensitive cell, diaphragm means positioned in the optical path between said sound record and said cell, optical means for forming an image of said sound record in the plane of said diaphragm means and optical means for projecting light rays from said source onto said cell to form a uniformly illuminated area said area being of fixed size and having an intensity of illumination which varies with the sound record.

8. In an apparatus for reproducing sound from a moving sound record having variable light transmitting characteristics, the combination of a light-sensitive cell, a light source for projecting light rays through the sound record onto said cell, and lens means between said film and said cell for projecting a substantially uniformly illuminated area onto said cell, said area being of a fixed size but having an intensity of illumination which varies with the sound record.

9. Apparatus for reproducing sound from a sound record comprising a light-sensitive cell having an electrode, a light source for illuminating the sound record, diaphragm means defining a slit positioned in front of said cell, an objective lens for imaging the illuminated sound record in said slit and a collective lens between said cell and said objective lens for projecting an illuminated area onto said electrode, the conjugate foci of said collective lens being positioned, respectively, at said objective lens and at said electrode.

LEON V. FOSTER.